Figure 1:
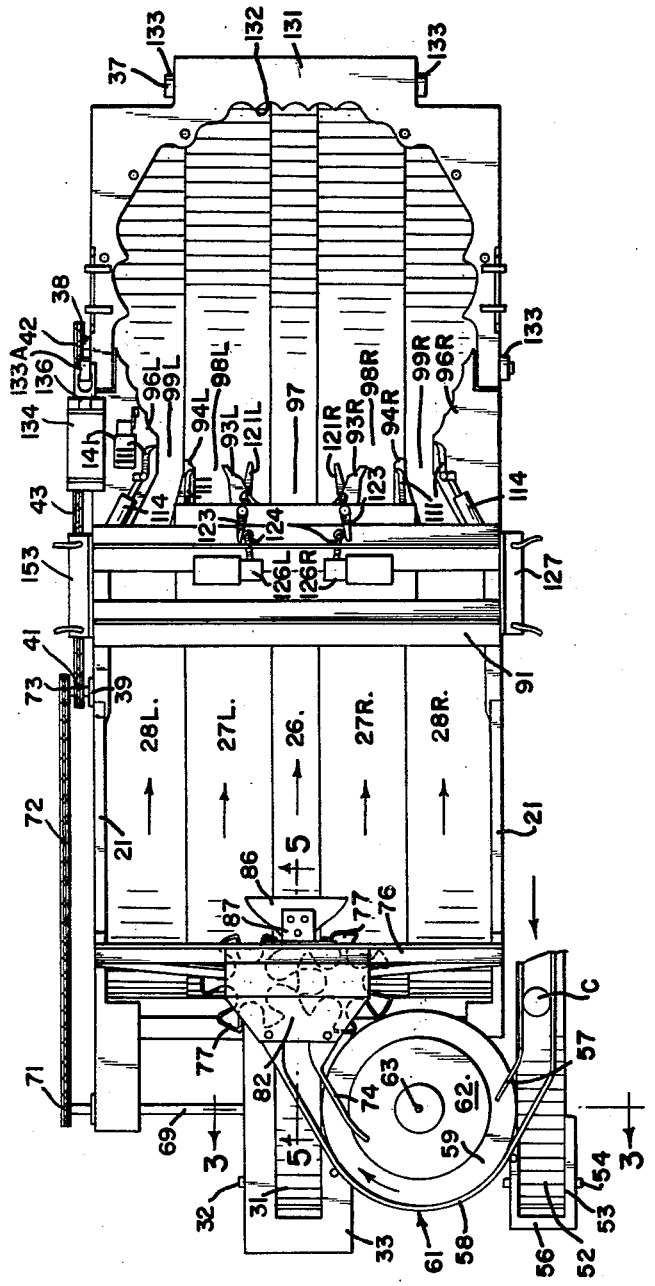

March 2, 1965  R. F. KRUPP  3,171,239
CONTAINER PATTERN FORMER FOR RETORT LOADING MACHINE
Filed May 23, 1962  6 Sheets-Sheet 1

INVENTOR.
Robert F. Krupp
BY
Townsend and Townsend
Attorneys

INVENTOR.
Robert F. Krupp

March 2, 1965  R. F. KRUPP  3,171,239
CONTAINER PATTERN FORMER FOR RETORT LOADING MACHINE
Filed May 23, 1962  6 Sheets-Sheet 4

INVENTOR
Robert F. Krupp

BY *Townsend and Townsend*
*attorneys*

March 2, 1965 R. F. KRUPP 3,171,239
CONTAINER PATTERN FORMER FOR RETORT LOADING MACHINE
Filed May 23, 1962 6 Sheets-Sheet 5

INVENTOR
Robert F. Krupp
BY
Townsend and Townsend
attorneys

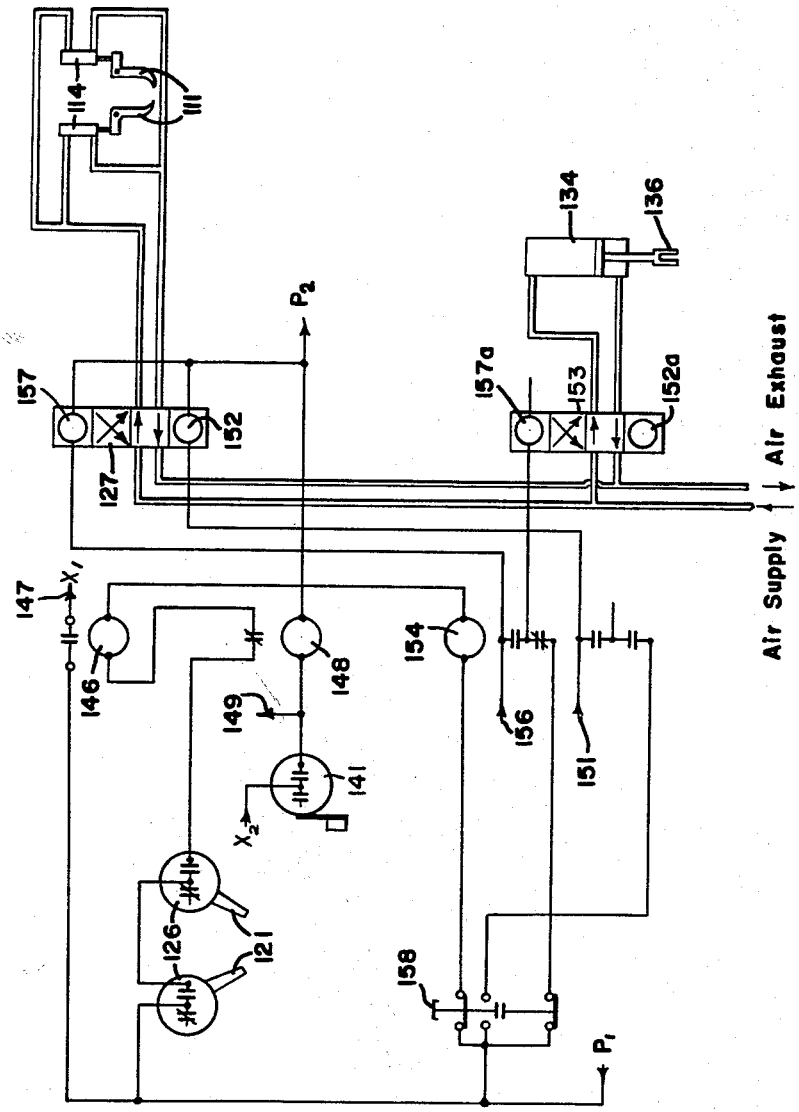

United States Patent Office 3,171,239
Patented Mar. 2, 1965

3,171,239
CONTAINER PATTERN FORMER FOR RETORT LOADING MACHINE
Robert F. Krupp, Oakland, Calif., assignor to Gerber Products Company, Fremont, Mich.
Filed May 23, 1962, Ser. No. 197,085
7 Claims. (Cl. 53—154)

This invention relates to a new and improved machine for forming containers into a circular pattern preparatory to loading into resorts by means of a loading machine using a lifting magnet having the same cross-section as the pattern.

Containers of the type used in connection with the present invention are metallic or glass containers having metal caps which are magnetizable. The invention is most useful with that type container which is relatively small and hence conventionally heat processed in retort crates. Retort crates of the type used with such containers are generally circular in cross section. The containers are filled into the machine in layers with separators placed between layers. A commonly used machine for loading such containers into such retort crates employs an electromagnet having a shape approximately equal to the cross section of the crate. Such a magnet is brought into proximity to the covers of the containers and is used to lift the containers from a table on which they have been deposited into the retort crates, whereupon the electric current is cut off causing the containers to remain in the crate when the magnet is withdrawn for the next layer. Efficient operation of the loading machine and efficient filling of the retort crates makes it disirable that the magnet pick up a full load of containers in each operation. A principal purpose of the present invention is to provide means for forming a pattern of containers on the table which contains the maximum number of containers to fit the shape of the magnet. Further, the entire circular pattern which will be brought into proximity with the electromagnet is filled with a minimum of voids.

A still further feature of the invention is the provision of means whereby the pattern heretofore described is formed in regular order by mechanical means, thereby reducing the possibility of incompletely filling each layer of the retort.

A still further feature of the invention is the provision of means whereby the pattern is formed rapidly without manual effort.

A still further feature of the invention is provision of means for handling the containers during the forming of the pattern in such manner that they are not likely to be damaged, tipped or jammed.

A still further feature of the invention is the provision of means forming the boundary of the pattern which is retractable so that after the pattern has been formed and when the magnet is brought into proximity with the containers the boundary retracts thereby reducing the likelihood of interference between the boundaries of the machine and the containers as they are lifted by the magnet.

A still further feature of the machine is the provision of a conveyor system which stores a quantity of containers between loading cycles thereby improving the rapidity of the loading operation.

Figure 2:
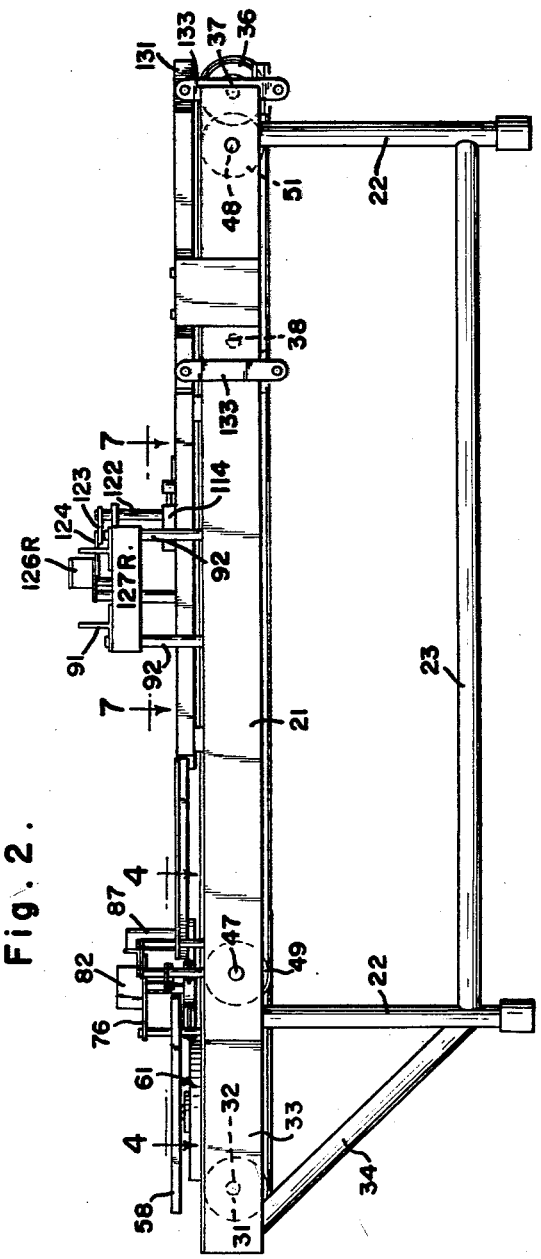
Figure 3:
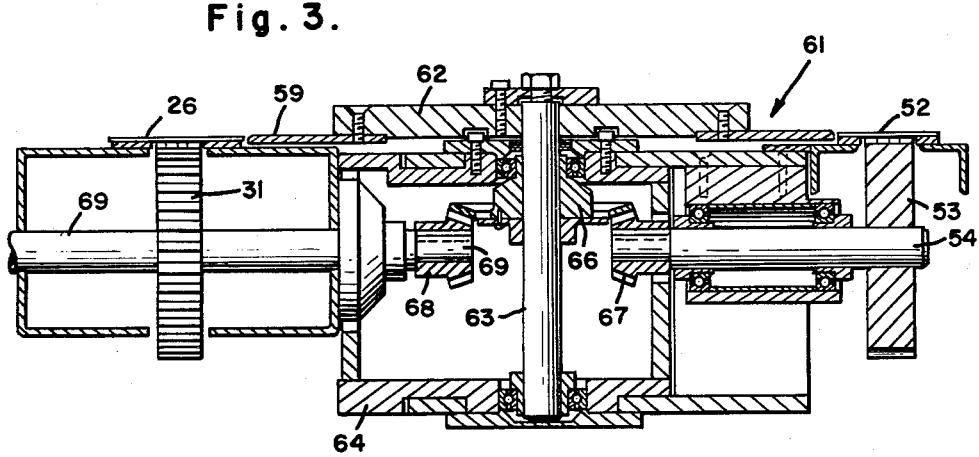
Figure 4:
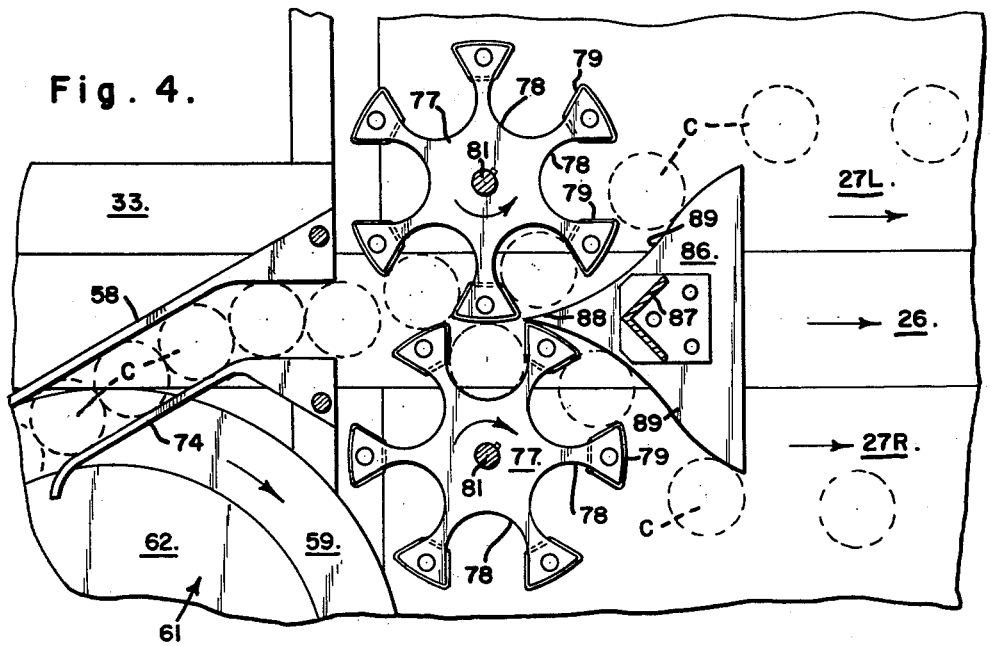
Figure 5:
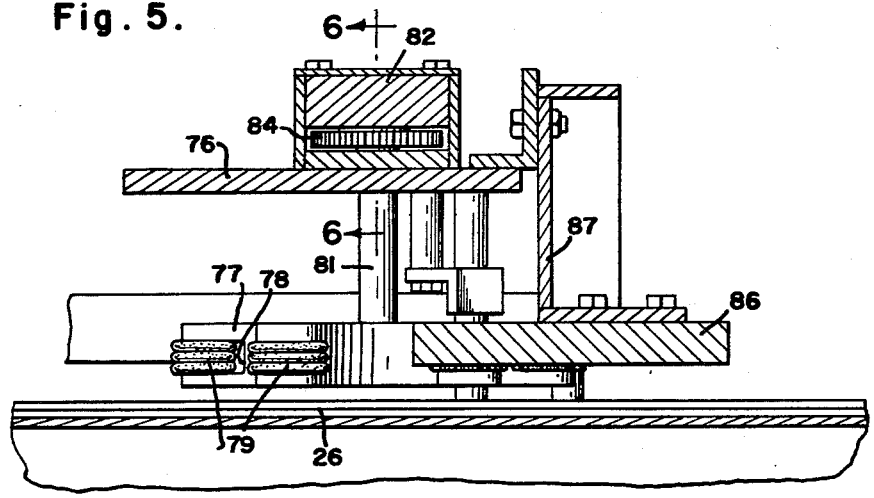
Figure 6:
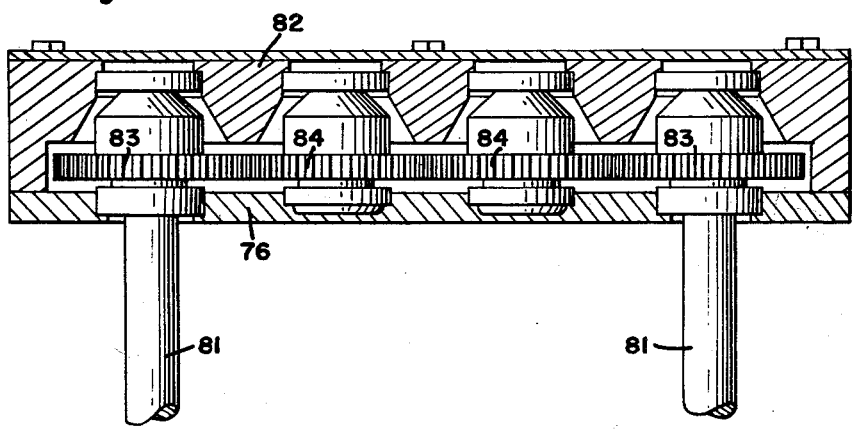
Figure 7:
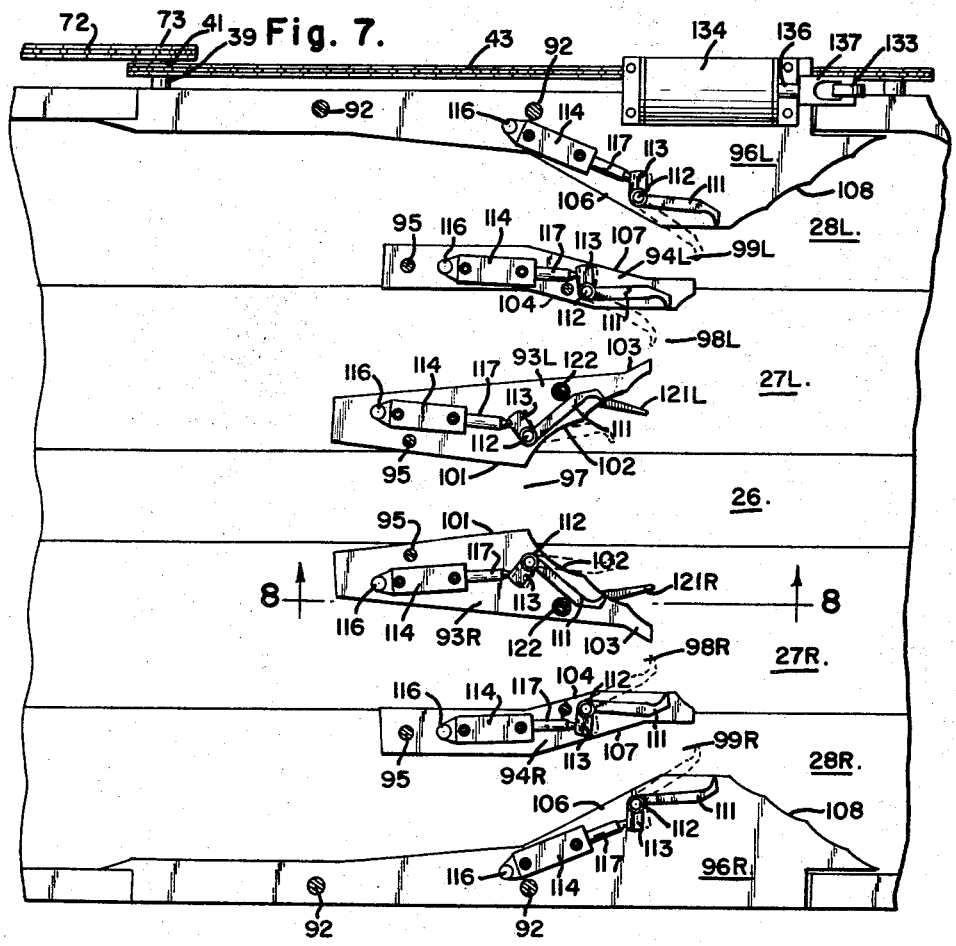
Figure 8:
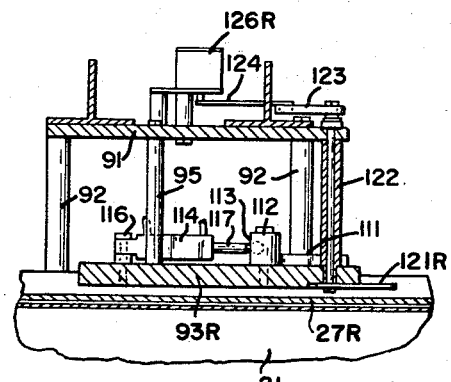

In the drawings:
FIG. 1 is top plan of the machine.
FIG. 2 is a side elevation thereof.
FIG. 3 is an enlarged fragmentary vertical sectional view taken substantially along the line 3—3 of FIG. 1.
FIG. 4 is an enlarged horizontal sectional view taken substantially along the line 4—4 of FIG. 2.
FIG. 5 is an enlarged vertical sectional view taken substantially along the line 5—5 of FIG. 1.
FIG. 6 is a sectional view taken substantially along the line 6—6 of FIG. 5.
FIG. 7 is an enlarged framentary horizontal sectional view taken substantially along the line 7—7 of FIG. 2.
FIG. 8 is a fragmentary sectional view taken substantially along the line 8—8 of FIG. 7.
FIG. 9 is a schematic electrical and pneumatic diagram of the machine.

The present invention is used to form into a circular pattern a plurality of containers, which for present purposes may be assumed to be glas jars suitable for packing baby food, closed with steel caps, it being understood that the invention is useful with other types of containers. This machine is used in conjunction with a commercially available retort crate loader which employs a circular electromagnet having the diameter of the inside of a conventional retort crate of which is brought down on top of a plurality of containers, the magnet then being energized to hold the containers whereupon the magnet is lifted and inserted inside a retort crate, the magnet de-energized and the cycle repeated. Since such a machine is well known in the art, no details thereof are herein illustrated and described.

The machine which is the subject of this invention has a frame having longitudinal horizontal side frame members 21 supported by legs 22 interconnected by horizontal and transverse cross braces 23.

Extending longitudinally of frame 21 are five conveyor belts, center belts 26, intermediate belts 27L and 27R, and two outer conveyor belts, 28L and 28R, the top surfaces of which move from left to right as viewed in FIG. 1. The five conveyors at their forward end comprise the table from which the magnet lifts the containers. Central conveyor 26 is narrower than the other four and extends from a position rearwardly of the machine to the front thereof. At its rearward end it is supported by sprocket 31 on transverse horizontal stub shaft 32 journaled in a rearward extension 33 of the frame, which extension 33 is supported by means of brace 34. At its forward end central conveyor 26 is driven by drive sprocket 36 journaled on transverse shaft 37 and driven by means of a chain drive, not herein illustrated or described in detail, but which will be understood by those skilled in the art, from shaft 38. Transverse shaft 37 is driven from countershaft 38 journaled in frame 21 which is turn driven from idler shaft 39 by sprockets 41 and 42 and chain 43. The speed of the movement of central conveyor 26 is greater than that of either intermediate conveyors 27 or outer conveyors 28. Intermediate conveyors 27 are supported at the rearward end by journal idler sprockets (not shown) on transverse shaft 47 and are driven by drive sprockets (not shown) on transverse shaft 37, transverse shaft 37 being driven from shaft 38 by means of chains and sprockets (not shown). The outer conveyors 28 are supported by sprockets 49 on shaft 47 and are driven by drive sprockets 51 on shaft 48 which are in turn driven from countershaft 38. The intermediate conveyors are driven at slower speed than the center conveyor and the outer conveyors are driven at slower speed than the intermediate conveyors.

Along the right side of the machine is a longitudinal, horizontally extending conveyor 52 of the flat link belt type. Such a conveyor 52 is driven by a drive pulley 53 on shaft 54 on extension 56 at the rearward end of the machine and, as viewed in FIG. 1 moves from right to left. Adjacent the end of conveyor 54 are inner and outer guides 57, 58 which divert containers from belt 52 onto rim 59 of turntable 61 which revolves in a clockwise direction as viewed in FIG. 1. Turntable 61, shown in detail in FIG. 3, has a central hub 62 with a peripheral annular rim 59 suitable for supporting containers approximately at the level of conveyors 52 and 26. Hub 62 is driven by vertical shaft 63 mounted by means of suitable bearings in box 64 secured to the frame of the machine. A bevel gear 66 is secured to shaft 63 and meshes with bevel gears 67 and 68 in box 64. Gear 68 is driven through shaft 69, which by means of sprocket 71, chain 72 and sprocket 73 drive idler shaft 39. Shaft 69 also carries sprockets (not shown) which connect to a driving means (not shown). Gear 68 drives gear 66 which in turn drives gear 67. Gear 67 drives sprocket 53 through shaft 54, the three gears 68, 66 and 67 providing for the reversal of conveyor travel between belts 26 and 52.

Container guide 58 curves around the periphery of turntable 61 and a second inner guide 74 is positioned in such manner that containers are directed from turntable rim 59 onto central conveyor 26 adjacent the rearward end thereof and are thence moved forwardly by central conveyor 26.

Located adjacent the rearward end of the machine is a rear superstructure 76 which extends up from frame 21 and transversely across the machine. As shown particularly in FIGS. 4 to 6 containers C on central conveyor 26 discharged from guides 58, 74 are received in the pockets of a pair of star wheels 77 depending from rear superstructure 76. Each said starwheel revolves in a horizontal plane and is formed with pockets 78 shaped to receive a container C, there being six pockets 78 in each wheel in a preferred embodiment shown. The pockets 78 of the two wheels are angularly related so that containers C are received alternately in the pockets of each wheel. To prevent damage to the container the points of the star wheels are provided with bumpers 79 consisting of strips of a rubber or rubber-like material, there being preferably three strips arranged in a vertical pattern. Starwheels 77 are not power driven but idle in fixed angular relationship relative to each other, depending from one of shafts 81 which depend from gear box 82 located on superstructure 76. The upper end of shaft 81 carries gear 83 which meshes with idlers 84. This provides the proper direction of rotation of the starwheels 77 which is shown by appropriate arrows in FIG. 4. Movement of containers C along conveyor 26 imparts rotative movement to wheels 77.

Located immediately forward of the intersection of starwheels 77 is a diverter plate 86 horizontally disposed and suspended from rear superstructure 76 by means of vertical leg 87. The diverter plate 86 has its rearward point 88 approximately at the intersection of the peripheries of starwheels 77 and its side edges 89 curve forwardly-outwardly. The width of the diverter 86 is greater than that of central conveyor 26 and hence the combined action of the movements of central and intermediate conveyors 26, 27L, 27R, the rotation of starwheel 77 separating and force imparted by diverter plate 86, the containers C are caused to be deposited alternately on the two intermediate conveyors 27L, 27R.

Located approximately midway of the length of the machine is a second or intermediate superstructure 91 which extends horizontally transversely of the machine and is supported above frame 21 by legs 92. Suspended by legs 95 from intermediate superstructure 91 are four gate-forming horizontally disposed, irregularly-shaped plates 93L, 93R, 94L, 94R and supported by frame 21 are, on opposite sides of the machine, outer gate-forming plates 96L, 96R, the six plates 93, 94, 96 cooperating to provide five gates 97, 98L, 98R, 99L, 99R, each having the width of containers C being handled. Central plates 93L, 93R have inner, inwardly-forwardly-slanted opposed edges 101, the forward ends of which define central gate 97 located centrally with respect to central conveyor 26. Beyond gate 97 is an irregularly shaped forward edge 102 curved out to partially define the rearward edge of the pattern of containers. The outer edges 103 of inner plates 93 are slanted forwardly-outwardly and in cooperation with intermediate plates 94 form the intermediate gates 98 for the intermediate conveyors 27. The inner edges 104 of plate 94 slant inwardly-forwardly to cooperate with edges 103 of inner plates 93 to define intermediate gates 98 which are located adjacent the outer edges of intermediate conveyors 27. Outer plates 96 have inner edges 106 slanting forwardly-inwardly and in cooperation with the forwardly-inwardly slanted edges 107 of intermediate plates 94 define outer gates 99 which are located adjacent the inner edges of outer conveyors 28. Forwardly of said outer gates 99 the edges 108 of outer plates 96 are irregularly curved to define a portion of the rear edge of the pattern of containers.

Each of the aforementioned plates 93, 94, 96 support adjacent one of gates 97, 98, 99 a detent 111 which is curved inwardly at its forward end and is supported and pivotally mounted to its respective plate by means of vertical shaft 112. Extending at appropriate angles to detent 111 is a crank 113 so that in essence each detent 111 comprises a bell crank pivoting in a horizontal plane about a vertical pivot 112. Pivotal movement of each detent 111 is controlled by individual horizontal longitudinally extending pneumatic cylinders 114 pivoted by means of pivots 116 to their respective plates. The rods 117 of said cylinders 114 engage and move cranks 113.

Located on the two central plates 93 are crowd switch arms 121L and 121R fixed to vertical pivot shafts 122 which extend above intermediate superstructure 91 and carry on their upper ends levers 123 to contact the switch arm 124 of microswitch 126. Thus when the pattern of containers crowds against switch arm 121 the arm is pivoted outwardly which pivots vertical shaft 122 and causes switches 126 to close, thereby controlling pneumatic valve 127 which energizes pneumatic cylinders 114 on the left and right sides of the machine, respectively, to move their corresponding detents into gate blocking position. The electrical means for this function are hereinafter described under "Operation." The gate blocking positions of the detent 111 are shown in dotted lines in FIG. 7, each detent being controlled by its individual pneumatic cylinder 114.

Located at the forward end of the machine and extending rearwardly along either side thereof is a template 131 which is formed with irregularly curved edges 132 complementary to the pattern of containers to be formed. Template 131 extends horizontally and is supported from frame 21 by means of a pair of links 133 on either side of the machine pivoted at their upper ends to template 131 and at their lower ends to frame 21. This mounting permits template 131 to rock forwardly from its normally rearward position so that as the magnet of the crate loading machine is ready to lift the containers from the pattern forming machine the template 131 is moved forwardly a short distance to prevent interference with the lifting of the pattern of containers. Movement of template 131 is controlled by horizontal longitudinally-extending cylinder 134, the rod 136 of which is connected by means of link 137 to rearward link 133 on one side of the machine. Cylinder 134 is actuated by pneumatic valve 153.

Located on one of the outside deflector plates 96L is a switch 141 arranged to be contacted by the electromagnet when it is in down position. Contact with the magnet throws switch 141 which in turn controls a solenoid which controls both pneumatic valves 153 and 127, as described under "Operation."

*Operation*

In use, containers C are received along outside conveyor 52, carried around in turntable 61 onto conveyor 26 and received in the pockets of star wheels 77 which rotate by reason of the movement of containers C, containers being alternately deposited on the two intermediate conveyors 27L, 27R. Assuming that the machine is empty of containers at a particular time in this cycle of operation, the containers are then carried down by intermediate conveyors 27 through the intermediate gates 98 and begin to build up beginning at the template 131 in the region of the intermediate conveyors 27 in a pyramid pattern having its base at the forward end of the machine and its apex gradually extending rearwardly. When the intermediate portion of the pattern is filled up, the containers tend to overflow from the intermediate conveyors 27 rearwardly of gates 98 in an outward direction thereby beginning the entrance of containers into the outer gates 99, which fills up the outer edges of the pattern of containers. When the outer edges are filled, the containers back up on the holding area rearward of the gates and when this area begins to fill up the containers then crowd over into the center of the machine and fill through the center gate 97. The containers contact the center switch arms 121 to close switches 126 only when the entire circular pattern forward of the gates is filled in an approximately full circle. Crowding of both switches 121 results in closing all detents 111, as hereinafter explained. However, the containers continue to be deposited between deflectors 86 and the gates, filling up in a holding area which is useful in rapidly filling the pattern on the next cycle.

The last two containers in the complete circular pattern close switches 126L and 126R. As shown in FIG. 9, closing these switches (which are in series) completes a circuit to time delay relay 146. The purpose of relay 146 is to allow time to overcome any false signal from switches 126 in the event that a container is passing the arms 121. Closing of relay 146 energizes line 147 which leads to the machine (not shown) which lifts the pattern of containers off the present machine. The lifting machine has a circular electromagnet which is lowered to a position slightly above the table of the present machine, physical contact of the magnet closing switch 141. Closing of switch 141 energizes reset relay 148 and line 149 and relay 148 de-energizes relay 146 to de-energize line 147 and hence stop lowering the magnet. By means forming no part of this invention and not shown herein, energizing line 149 energizes the electromagnet and reverses the movement thereof from down to up, and also through external line 151 closes the coils 152, 152a of valves 127 and 153, normally open relay 154 being closed. Energizing coil 152 shifts valve 127 to supply air to all six cylinders 114 to close all detents 111 against further container flow. Energizing coil 152a shifts valve 153 to cause cylinder 134 to extend rod 136 to move template 131 from the pattern of containers. This permits the magnet to lift all containers without interference from external forces.

When the magnet has been elevated to the required height, means associated with the lifting machine energizes line 156 which energizes coils 157, 157a thereby reversing valves 127 and 154, opening detents 111 and pulling template 131 back to proper location so that another layer of containers may be accumulated.

Jog switch 158 is a three position, three pole push button switch to provide for manual jog of the pattern forming machine if such is required. In normal operation relay 154 is energized, as had been mentioned. Partial actuation of switch 158 de-energizes normally closed relay 154 but does not open the bottommost contacts and hence coil 157a is energized to allow air to pull template 131 if valve 153 is shifted.

Total actuation of switch 158 opens both top and bottom contacts but closes the middle contacts thereby energizing coil 152a, shifting valve 153 to project rod 136 and push template 131 out of position. Partial release of switch 158 opens the middle contacts and uppermost contacts but closes the bottom contacts, thus pulling back template 131. Total release of switch 138 energizes relay 154 and re-establishes automatic control of lines 151 and 156. It will be seen, therefore, that relay 154 has two functions: First, to permit jogging of template 131 through manual actuation of switch 158; and, second, to isolate valve 127 and lines 151 and 156 during such jogging.

What is claimed is:
1. In a pattern forming machine, a horizontal traveling table, driving means for moving said table, means for delivering containers onto said table, means defining a plurality of gates disposed above said table, detents mounted in said gates, means for actuating said detents to close said gates to the passage of containers through said gates when containers have backed up from a position beyond said gates to a position adjacent said gates, a template mounted at the end of said table beyond said gates, said template being shaped complementary to an extended portion of the periphery of the pattern to be formed, and means adjacent said gates shaped complementary to other portions of said periphery, said last mentioned means, said template and said detents when in closed position defining substantially the entire periphery of said pattern.

2. A machine according to claim 1 which further comprises a crowd switch positioned adjacent one of said gates to be closed by containers backing up to said one gate, said switch arranged to energize said means for actuating said detents.

3. A machine according to claim 1 which further comprises means for moving said template in a direction away from said gates and switch means for energizing said last mentioned means.

4. A machine according to claim 1 which further comprises means above said table on the end of said table opposite said template for distributing containers substantially equally on opposite sides of said table.

5. A machine according to claim 1 which further comprises a diverter plate positioned above said table shaped to direct containers toward opposite side edges of said table and means for alternately feeding containers against opposite sides of said diverter plate.

6. A machine according to claim 5 in which said last-mentioned means comprises a pair of pocketed wheels, said wheels having alternate pockets, means for rotating said wheels in opposite directions at the same speed, and means for feeding containers into said pockets.

7. A machine according to claim 1 in which said table comprises a plurality of continuous belts, the innermost of said belts being driven by said driving means faster than said outer belts.

References Cited by the Examiner
UNITED STATES PATENTS
2,650,746   9/53   Rideout et al. _____ 53—166
3,032,943   5/62   Reimers et al. _____ 53—48

FRANK E. BAILEY, *Primary Examiner.*
ROBERT A. LEIGHEY, *Examiner.*